United States Patent [19]
Morgan

[11] Patent Number: 6,117,458
[45] Date of Patent: Sep. 12, 2000

[54] SWINE FEED COMPOSITION

[76] Inventor: Norma B. Morgan, 5381 Lavey La. #B, Baker, La. 70714

[21] Appl. No.: 09/323,386

[22] Filed: Jun. 1, 1999

[51] Int. Cl.$^7$ ....................................................... A23K 1/18

[52] U.S. Cl. .............................. 426/2; 426/635; 426/656; 426/807; 426/630; 426/657

[58] Field of Search ................................ 426/2, 807, 657, 426/656, 635, 630

[56] References Cited

U.S. PATENT DOCUMENTS

| | | | |
|---|---|---|---|
| 3,617,298 | 11/1971 | Kohl | 99/2 |
| 4,069,350 | 1/1978 | Monsod, Jr. | 426/635 |
| 4,161,543 | 7/1979 | Glabe et al. | 426/2 |
| 4,357,358 | 11/1982 | Schanze | 426/62 |
| 4,376,129 | 3/1983 | Plukovich et al. | 426/64 |

OTHER PUBLICATIONS

Compton's Encyclopedia, New Millennium Ed.,Setion PIG, pp. 379; Success Pub Group, 2000.

The World Book Encyclopedia, Section HOG, p. 287; World Book Inc., 2000.

*Primary Examiner*—Chhaya D. Sayala
*Attorney, Agent, or Firm*—Richard J. Hammond

[57] ABSTRACT

A dry feed composition for swine is disclosed. The dry feed composition includes as ingredients at least one or more animal protein products, marine products, milk products, grain products, plant protein products and processed grain by-products as well as natural and artificial flavors so as to balance the feed ration for protein, fiber, energy and palatability. The dry feed composition additionally comprises sufficient protein product to form a dry feed composition comprising a total crude protein content of at least 19%.

By feeding the swine the dry feed composition of the present invention, the period of time required to bring swine to market is substantially reduced.

5 Claims, No Drawings

SWINE FEED COMPOSITION

FIELD OF INVENTION

This invention relates generally to a livestock feed. More particularly, this invention relates to an improved dry feed for swine.

BACKGROUND OF INVENTION

Although there is not much difference in the ability of swine and ruminants to digest feed concentrates that are not high in fiber, the great difference in the swine's digestive tract does require qualitative distinction in their feed and feed supplements. For example, swine are not able to make much use of fibrous materials, such as roughage, nor are swine able to sufficiently utilize many of the minerals that are conventional in the feed of ruminants. Differing from cattle, sheep and horses, swine need a high quality protein since there is little synthesis of good quality protein in their digestive tracts such a occurs in the rumen of cattle and sheep and in the caecum and large intestines of horses. Swine also grow more rapidly than ruminants. Accordingly, swine requirement for protein (amino acids), certain minerals and vitamins are generally at a higher level than required by the ruminants. For these reasons, inter alia, swine feeds and ruminants feeds are not interchangeable.

Swine feed compositions are generally divided into transition feeds, either milk-based or corn-based and used to wean a piglet from its natural source (milk from the mother), and finishing feeds, which are employed to take the piglet from the transition stage thru to the point where the more fully grown pigs are brought to market.

These feeds normally include a number of standard ingredients which are present to balance the food ration as to protein, fiber, energy and palatability. Such ingredients include, for example, animal protein products, marine products, milk products, grain products, plant protein products and natural and artificial flavors. Also included in these feeds are micro and macro minerals, amino acids, vitamins, animal fats, vegetable fats and preservatives. Additionally, field corn which is normally grown for feeding stock, such as yellow dent corn, flint corn and the like has long been the standard feed stuff or ingredient for transition feeds to provide carbohydrates for starting thru finishing rations for swine.

In the feeding of piglets that have been weaned from their mothers milk, it is desired to produce the greatest weight gains in the shortest period of time. Normally, using typical hog ration compositions for finishing purposes, a period of approximately six months is required to take the weaned piglet (of about 22 pounds) to the finished hog (of about 200 pounds) stage. Such typical hog compositions are those that contain about 14–15% crude protein.

The dry finishing feed compositions noted above usually produce acceptable weight gains in the expected time periods (typically, market-ready hogs weigh about 200 to 250 pounds, achieving such weight from about 24 weeks after weaning). However, such feeds are not necessarily as efficient as desired to be beneficial to the hog producer. Accordingly, efforts are constantly being made to formulate both transition and finishing feeds which will cause the piglets to consume more and grow more rapidly thereby producing a more efficient pig. The producer, the nutritionist and feed manufacturer, therefore, are constantly striving to formulate such a feed.

Accordingly, it is an object of the present invention to provide an improved livestock feed and, in particular, an improved dry finishing feed composition for swine.

A further object of the present invention is to provide such a feed composition which is more palatable to the swine and thus consumed more completely so that earlier weight gains are realized.

Still another object of the present invention is to provide a dry finishing hog feed composition that will produce the greatest weight gain in the shortest period of time.

SUMMARY

The above objects are accomplished by formulating a dry feed composition for swine. The dry feed composition includes as ingredients at least one or more animal protein products, marine products, milk products, grain products, plant protein products and processed grain by-products as well as natural and artificial flavors so as to balance the feed ration for protein, fiber, energy and palatability. The dry feed composition additionally comprises sufficient protein product to form a dry feed composition comprising a total crude protein content of at least 19%.

By feeding the swine the dry feed composition of the present invention, the period of time required to bring swine to market is substantially reduced.

DESCRIPTION OF THE PREFERRED EMBODIMENTS

Generally, the controlled feeding of swine is critical. The reasons are twofold. First, when swine are inadequately fed, they are apt to suffer from severe nutritive deficiencies much more frequently than are cattle, sheep or horses. Therefore, they must be fed at least a nutritive minimum. Second, swine have a greater capacity to consume feed in proportion to their live weight than do the ruminants. Because of this and also because of their greater efficiency in the utilization of food nutrients, they make more rapid weight gains in proportion to their live weight. Well fed pigs, for example, make more than twice as great a gain in weight per 100 pounds live weight from weaning time to market weights as do fattening calves, and three times as much as made by fattening lambs. Accordingly, controlling the amounts of feed fed to the pigs is essential.

The principle material required in the composition of the present invention is crude protein. Because of the ability of the pigs digestive tract to utilize protein from any source, i.e., from animal or vegetable products, such crude protein may be from: vegetable sources, that is, grains such as corn, wheat, milo, barley, sorghum, soybean, etc.; or it may be from animal sources, that is beef, chicken, etc. scraps or marine (fresh or saltwater fish scraps). Additionally, swine can utilize food which might otherwise be discarded, such as garbage and garden wastes. It is only important for the compositions of the present invention that the overall concentration of crude protein (from any source) be at the minimum as set forth herein to achieve the improved effects in weight gain as disclosed and claimed herein.

In general, the content of dry matter, in addition to the critical amounts of crude protein as disclosed herein, such as various nutrients, calcium, phosphorous, etc. in swine rations per head are set forth in the Appendix II, of *Feeds and Feeding,* 22d Edition by Frank Morrison, published in 1956. However, variations in these compositions are permitted.

In accordance with the compositions of the present invention, the compositions discovered have been found to produce an unexpectedly rapid weight gain of piglets into finished and market-ready pigs. Although most swine feeds contain crude protein, it has been discovered that by having at least 19% crude protein in such swine feed the rapid weight gain can be effected. Preferably, the amount of crude protein the swine feed is at least 21%, most preferably at least 23%. Amounts of crude protein in excess of the most preferable produce even more rapid weight gains than shown in the illustrative examples, below.

The following examples are provided for illustration purposes only, and are not meant to limit the invention in any way.

EXAMPLES

A total of 25 piglets (or shoats), weaned from their mothers milk and having an average weight of 22 pounds, were divided into five groups on the first day of being weaned. The piglets were fed compositions designated in Table 1 for a period of 11 weeks. At this point they were considered as ready for market and finished hogs.

The feeding regime comprised a morning feeding of each of the five groups a ration of 20 pounds of a concentrated carbohydrate feed comprising about 50% bread products and 50% milk products and, additionally, 4 pounds of ARROW 14% Hog Feed (Formula #1) as well as an evening feeding of 4 pounds the experimental formulations, as follows. Formula #1, 4 pounds of ARROW 14% (these are the control animals); Formula #2 comprised 2 pounds of ARROW 14% and 2 pounds of Formula #3 (for a total crude protein of 16%); Formula #3 comprised 4 pounds of Texas Farm Products 21% feed; and Formula #4 comprised 4 pounds of the Nutrena (32% crude protein) feed for each of the other 5-piglet groups. All rations were administered by the self-feeding route.

The analysis of the contents of each of the feed compositions is shown below

TABLE 1

| | Formula Number* | | | | |
|---|---|---|---|---|---|
| | 1 | 2 | 3 | 4 | 5 |
| Crude Protein, % | 14 | 16 | 19 | 21 | 23 |
| Crude Fat, % | 2.5 | 4.0 | 8.0 | 13 | 2.5 |
| Crude Fiber, % | 6.5 | 6.0 | 4.0 | 3.5 | 7.5 |

*Formula #1 is ARROW 14% Hog Pellets; O'Neals Feeders Supply, Inc., DeRidder, LA 70634;
Formula #2 and 3 used Texas Farm Products Co. 21% Protein Feed, Nacodoches, TX;
Formula #3 is Texas Farm Products Co. 27% Protein Feed, Nacodoches, TX; and
Formula #4 is CARGILL Nutrena Feed Division #960 L 9806, Minneapolis, MN, 32% protein.
All formulations additionally contain at least one or more animal protein products, marine products, milk products, grain products, plant protein products and processed grain by-products as well as mineral supplements, vitamin supplements, and natural and artificial flavors.

The results of these illustrative feedings are shown in Table 2, below.

TABLE 2

| Finished Hog Group | Average Weight of Group | % Gain In weight | % Gain in weight For each % of Crude protein |
|---|---|---|---|
| Control | 143 | — | — |
| Formula #2 | 153 | 5.3 | 0.3 |
| Formula #3 | 167 | 17.2 | 1.0 |
| Formula #4 | 175 | 22.8 | 1.1 |
| Formula #5 | 204 | 43.2 | 1.9 |

As can be seen from the illustrative examples and tables, the feeding of swine with crude protein in excess of 19% in their feed ration, causes a more rapid increase in weight than experienced with lesser amounts of such ingredient. The above examples also clearly show that as the percent crude protein in such swine feed increases above 19%, the efficiency of feed utilization, i.e., the conversion of crude protein into hog weight, also increases. While no data are yet available, the extrapolated data suggest that even higher percentages of crude protein than used in these examples will produce even further increases in weight over time. While it is necessary to continue to feed swine the essential nutrients, i.e., fats, vitamin supplements and mineral supplements, crude protein content of swine feed can be increased to as much as about 50% or more with corresponding weight gain, to produce a finished, market-ready hog in a period of time in less than or about two months.

I claim:

1. A process for feeding swine comprising feeding the swine a dry feed composition, to produce a finished, market-ready weight said composition consisting of, as ingredients, at least one of an animal protein product, marine product, milk product, grain product, plant protein product or processed grain by-product, the total amount of crude protein from such products being at least 21%, crude fat from about 2.5% to 8.0% and crude fiber from about 3.5% to 7.5%, natural and artificial flavors so as to balance the feed ration for protein, fiber, energy and palatability and mineral and vitamin supplements thereby producing the weight gain in at least 11 weeks in said swine.

2. The process according to claim 1 wherein said total crude protein content is from about 21% to about 50%.

3. A process for feeding swine comprising feeding the swine a dry feed composition, to produce a finished, market-ready weight said composition consisting of, as ingredients, at least one of an animal protein product, marine product, milk product, grain product, plant protein product or processed grain by-product, the total amount of crude protein from such products being at least 23%, crude fat from about 2.5% to 8.0% and crude fiber from about 3.5% to 7.5%, natural and artificial flavors so as to balance the feed ration for protein, fiber, energy and palatability and mineral and vitamin supplements thereby producing the weight gain in at least 11 weeks in said swine.

4. A method for substantially decreasing the period of time required to bring swine to market and producing a finished, market-ready hog said method comprising feeding said swine according to the process of claim 3.

5. A method to bring swine to market in a period of time that is about eleven weeks by using a process for feeding swine comprising feeding the swine a dry feed composition, consisting of, as ingredients, at least one of an animal protein product, marine product, milk product, grain product, plant protein product or processed grain by-product, the total amount of crude protein from such products being at least 23%, crude fat from about 2.5% to 8.0% and crude fiber from about 3.5% to 7.5%, natural and artificial flavors so as to balance the feed ration for protein, fiber, energy and palatability and mineral and vitamin supplements.

* * * * *